United States Patent
Simon

(10) Patent No.: US 7,430,471 B2
(45) Date of Patent: Sep. 30, 2008

(54) METHOD AND SYSTEM FOR MONITORING A VEHICLE

(75) Inventor: Franklin C. Simon, Hollywood, FL (US)

(73) Assignee: Payment Protection Systems, Inc., Temecula, CA (US)

( * ) Notice: Subject to any disclaimer, the term of this patent is extended or adjusted under 35 U.S.C. 154(b) by 0 days.

(21) Appl. No.: 11/257,122

(22) Filed: Oct. 25, 2005

(65) Prior Publication Data

US 2006/0111822 A1 May 25, 2006

Related U.S. Application Data

(60) Provisional application No. 60/621,075, filed on Oct. 25, 2004.

(51) Int. Cl.
*G08B 5/22* (2006.01)
*G01C 21/26* (2006.01)
*G06F 17/00* (2006.01)

(52) U.S. Cl. .......................... 701/200; 701/2; 701/207; 340/571.2; 340/5.52; 307/10.2

(58) Field of Classification Search ................ 701/23, 701/32, 33, 35, 3, 207, 213, 2, 200; 340/426.1, 340/426.16, 429, 430, 571.2, 5.21, 5.52, 340/5.82, 991; 307/10.2; 342/357.07, 357.09
See application file for complete search history.

(56) References Cited

U.S. PATENT DOCUMENTS

| | | | | |
|---|---|---|---|---|
| 5,311,197 | A * | 5/1994 | Sorden et al. ............... | 342/457 |
| 6,035,039 | A * | 3/2000 | Tisdale et al. ............... | 380/249 |
| 6,225,890 | B1 * | 5/2001 | Murphy ................ | 340/426.19 |
| 6,426,693 | B1 * | 7/2002 | Inomata ................. | 340/539.21 |
| 6,489,897 | B2 | 12/2002 | Simon | |
| 6,658,572 | B1 * | 12/2003 | Craig .......................... | 726/16 |
| 6,717,527 | B2 | 4/2004 | Simon | |
| 6,718,235 | B1 * | 4/2004 | Borugian ....................... | 701/1 |
| 6,828,692 | B2 | 12/2004 | Simon | |
| 6,847,864 | B2 * | 1/2005 | Goto et al. ..................... | 701/1 |
| 6,870,467 | B2 | 3/2005 | Simon | |
| 7,009,499 | B2 * | 3/2006 | Bernosky et al. ......... | 340/426.1 |
| 2002/0128769 | A1 | 9/2002 | Der Ghazarian et al. | |
| 2002/0140542 | A1 * | 10/2002 | Prokoski et al. ............ | 340/5.52 |
| 2003/0006886 | A1 * | 1/2003 | Gabbard ................. | 340/425.5 |
| 2004/0008103 | A1 * | 1/2004 | Kady et al. ................ | 340/5.52 |
| 2004/0093159 | A1 * | 5/2004 | Bernesi et al. .............. | 701/220 |
| 2004/0204795 | A1 * | 10/2004 | Harvey et al. .................. | 701/1 |
| 2005/0134438 | A1 | 6/2005 | Simon | |

(Continued)

OTHER PUBLICATIONS

TrackNet Online GPS Fleet Tracking Systems—featuring Discrete Wireless . . . , downloaded from the Internet on Sep. 21, 2005 at http://www.trackonline.com/?num=18882278975.

(Continued)

*Primary Examiner*—Tan Q Nguyen
(74) *Attorney, Agent, or Firm*—Crowell & Moring LLP

(57) ABSTRACT

A method for monitoring a vehicle includes detecting movement or activation of the vehicle, transmitting a signal indicating movement or activation of the vehicle, to a control center, transmitting any received operator identification information to the control center, and determining whether an operator identification was received within a time interval of the detected movement or activation of the vehicle.

28 Claims, 2 Drawing Sheets

U.S. PATENT DOCUMENTS

2006/0061476 A1* 3/2006 Patil et al. ............... 340/572.4

OTHER PUBLICATIONS

Advanced Tracking Technologies, Inc., GPS Vehicle Tracking Systems, GPS Tracking, downloaded from the Internet on Sep. 21, 2005 at http://www.advantrack.com.

Discrete Wireless, GPS Fleet Management, Real Time Vehicle Tracking, Fleet Tracking System . . . , downloaded from the Internet on Sep. 21, 2005 at http://www.discretewireless.com/index.asp.

DieselBoss, Fleet GPS Tracking and Truck Management System, downloaded from the Internet on Sep. 21, 2005 at http://www.dieselboss.com/track/track.htm.

* cited by examiner

METHOD AND SYSTEM FOR MONITORING A VEHICLE

This application claims priority to U.S. Provisional Patent Application No. 60/621,075 filed in the U.S. Patent and Trademark Office on 25 Oct. 2004, under 35 U.S.C. § 119(e). U.S. Provisional Patent Application No. 60/621,075 is hereby incorporated by reference in its entirety.

BACKGROUND OF THE INVENTION

1. Field of the Invention

The present invention relates to a method and system for monitoring a vehicle. More specifically, the vehicle can be monitored with regard to many different functions, and appropriately controlled.

2. Description of the Related Art

Systems are presently available to automatically provide the present location of a truck to a communication or dispatch center, whereby a location of the truck provided by an on-board Global Positioning System (GPS) receiver is provided to the communication or dispatch center via a radio transceiver mounted on the truck. Maintaining some control over monitored vehicles such as trucks, however, would be of great value to the industry.

SUMMARY OF THE INVENTION

A method for monitoring a vehicle includes detecting movement or activation of the vehicle, transmitting a signal indicating movement or activation of the vehicle, to a control center, transmitting any received operator identification information to the control center, and determining whether an operator identification was received within a time interval of the detected movement or activation of the vehicle.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements.

DETAILED DESCRIPTION OF THE PREFERRED EMBODIMENTS

Figure 1:
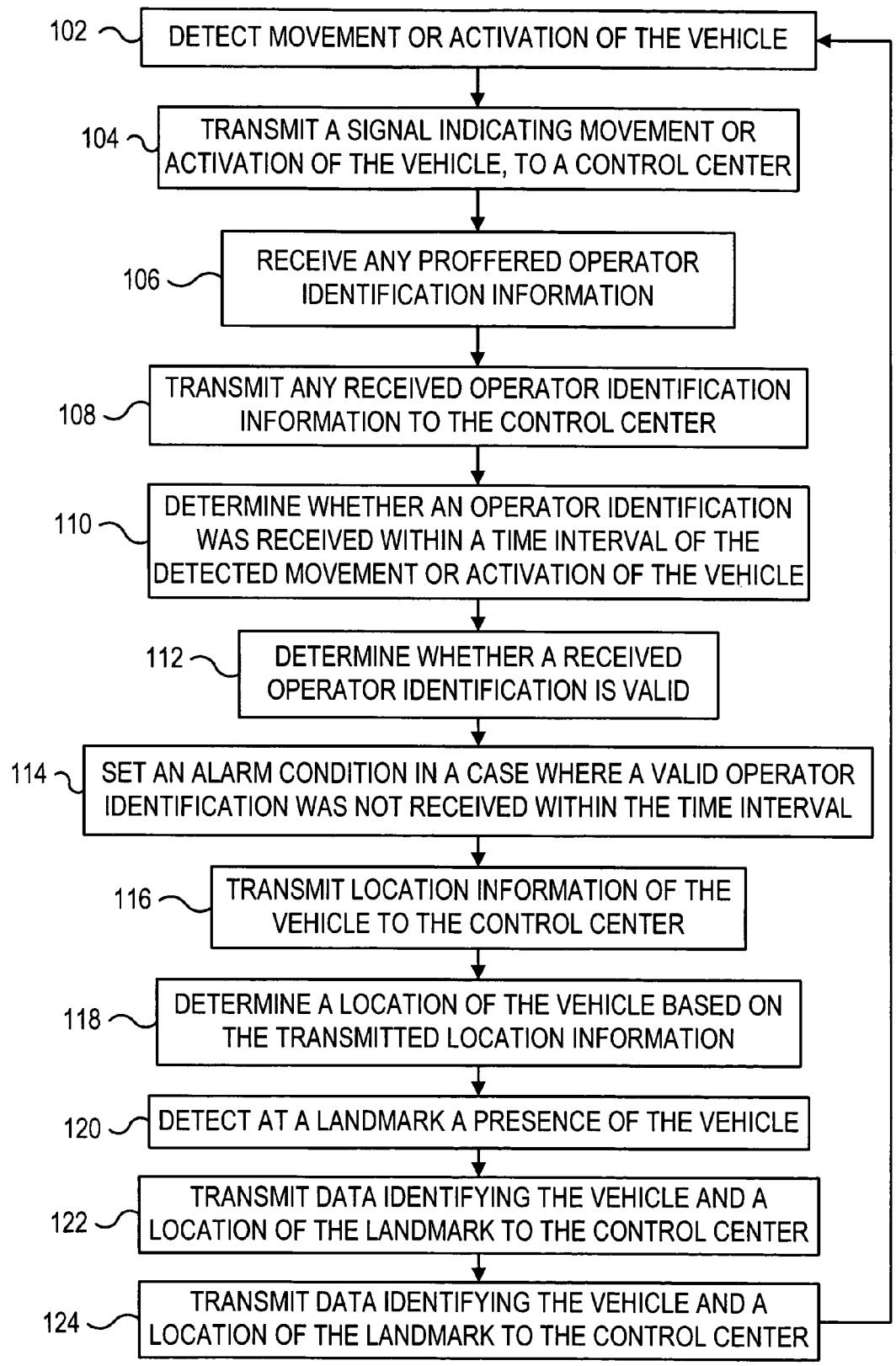
FIG. 1 shows an exemplary method.

FIG. 1 illustrates an exemplary embodiment including a method where in a first block 102 movement or activation of a vehicle is detected. Movement can be sensed, for example, by a motion sensor, a shock sensor, or for example by signals from drive components of a vehicle. Activation of the vehicle can include, for example, sensing when vehicle doors have been opened, when an ignition switch has been partially or wholly activated, and so forth. Any device, signal or indication of entry or tampering with the vehicle can be used to represent detected movement or activation of the vehicle. From block 102, control proceeds to block 104 where a monitoring system installed in the vehicle transmits a signal to a control center indicating that movement, activation or other tampering with the vehicle has occurred. This signal can include, for example, details regarding the incident being reported. From block 104, control proceeds to block 106 or any proffered operator identification information is received.

The information can be received, for example, by the monitoring system installed in the vehicle, for example via a token reader that reads or senses a token presented by the operator such as credit card, a proximity tag, a radio frequency identification tag, or other token or device that can be used to present identification or authentication information to the monitoring system. The reader can include, for example, a radio frequency identification (RFID) reader, an electronic card reader, an optical sensor, or any other reader capable of or arranged to receive information from the token presented by the operator. In an exemplary method, the operator presents biometric identification such as a fingerprint, a retinal pattern, a voice or speech sample, or any other biometric measure or combination of measures. Exemplary embodiments of the monitoring system include scanners or other devices adapted to receive such biometric identification, for example, passive and/or active image sensors, microphones, and so forth. A tactile or a voice operated user interface can also be used, to allow the operator to present an alphanumeric or other identification code. Such a user interface can include, for example, a keyboard, a voice-operated selection menu, a touch screen, and so forth. From block 106, control proceeds to block 108 where any operator identification information received by the monitoring system installed in a vehicle is transmitted to a control center.

From block 108, control proceeds to block 110, where a determination is made (for example, by the control center) whether an operator identification was received by the monitoring system within a time interval of detected movement, detected activation of the vehicle, or other detected tampering or action to the vehicle. The time interval can include a predetermined time radius extending before and after the detection, can be a time interval prior to the detection, and/or can be a time interval following detection of the movement, activation or tampering. For example, the time interval can a one minute interval straddling the detection, a one minute interval immediately proceeding the detection, or a one minute interval following a detection, for example, a first detection within a larger time interval. From block 110, control proceeds to block 112 where a determination is made whether a received operator identification is in fact a valid identification. For example, "validity" can be based on whether the identification is known to the control center, whether the identification is current, whether the identification is associated with a class of users who have authority or permission to use the vehicle and so forth.

From block 112, control proceeds to block 114 where an alarm condition is set in a case where a valid operator identification was not received within the time interval. The determinations of blocks 110 and 112, as well as the setting of an alarm condition, can be performed variously in one or more of a monitoring system installed in the vehicle, and the control center that communicates with the on-vehicle or in-vehicle monitoring system.

From block 114, control proceeds to block 116, where the monitoring system transmits location information of the vehicle to the control center. From block 116, control proceeds to block 118, where a location of the vehicle is determined based on the transmitted location information. In a case where the transmitted location information includes geographic coordinates provided by a global positioning system (GPS) receiver onboard or nearby the vehicle, the location information indicates the location directly and the determination is made, for example, by recognizing or receiving the transmitted location information. In other exemplary methods and embodiments, the signal itself is used to determine or help determine a geographic location of the vehicle, for example, in a configuration where multiple receivers at different locations receive the transmitted signal and a location of the vehicle (e.g. of the transmitter on or near the vehicle that is sending the signals) is determined by triangulation using for example relative and/or absolute signal strengths and/or signal timing of the signal as received by the different receivers. From block 118, control proceeds to block 120 where a presence of the vehicle is detected at a landmark. A landmark can be, for example, any geographic location. From block 120, control proceeds to block 122, where data is transmitted identifying the vehicle and a location of the landmark, to the control center. Consider the following specific example. A parking stall contains an RFID tag or other machine-readable information tag or source that can be read or queried by the monitoring system on a vehicle so that when a vehicle comes within a predetermined distance of the landmark (e.g. the parking stall), the parking stall will provide location and/or identification information of the parking stall to the monitoring system on or in the vehicle, which can then report or transmit this information to the control center to inform the control center of the vehicle's current location. In another exemplary embodiment, the vehicle can include an RFID tag or other machine readable passive or active information source or device which can be read by a reader at the parking stall or other landmark, and provide vehicle and/or operator information to the landmark which can then transmit some or all of this information in addition to information identifying or characterizing landmark, to the control center. These embodiments can be implemented, for example, with passive RFIDs, active RFIDs, or any other suitable technology. From block 124, control may return to block 102, for example in an instance where the vehicle is shut down, the operator is disassociated from, or released from responsibility, the vehicle so that the vehicle awaits a new operator. The blocks shown in FIG. 1 can be variously omitted and/or performed in a different sequence than that shown. In addition, vehicle status and/or specification information can be transmitted together with or in addition to other information such as operator identification and vehicle location and vehicle identification from the monitoring system to the control center. For example, mechanical status of various systems and subsystems of the vehicle can be transmitted, including for example, battery voltage, fluid levels and/or pressures such as tire pressure, engine oil pressure, engine oil temperature, engine oil level, fuel level, coolant level, vehicle payload status, or any other fault or status codes relating to capacities, capabilities, status and/or activity of the vehicle. Thus, the vehicle can be remotely monitored, and in accordance with exemplary embodiments can be associated with or assigned to a particular operator. Operator identification information can be unique to that particular operator, and/or can include identification information unique to a group of operators.

Thus, exemplary monitoring systems and/or methods allow a particular operator to be associated with a particular vehicle, and also allow the control center to become aware of unauthorized usage of the vehicle, for example when the vehicle is operated and a (valid) operator identification has not been received, has not been received within acceptable time constraints, or is otherwise unacceptable and thus merits an alarm or warning to be raised to or by the control center, so that responsive or corrective action can be initiated.

In an exemplary embodiment, the monitoring system can prevent complete or partial activation of the vehicle, for example by preventing the vehicle's engine from being started until after an acceptable operator identification has been presented to and received by the monitoring system. The vehicle can of course be disabled in various ways, for example by preventing ignition of the engine, by limiting a speed of the vehicle, by limiting transmission gear selection of the vehicle, by activating the horn and/or lights of the vehicle in a distinctive pattern, and so forth. In another exemplary embodiment, an operator checks out a key for control systems of the monitoring system and/or the vehicle in a fashion made known to the control center (e.g., via the same mechanisms used by the monitoring system on or in the vehicle to receive or detect identification information of the operator but located separately and/or operating independently of the vehicle. Thus, when the checked outkey is used to access and/or operate the vehicle, operation of the vehicle by the operator is presumed to be correct and authorized to use the vehicle. In the landmark example described above, identification information of the landmark (e.g., a parking garage) can simply be an identification number or code designating the landmark, which the control center can, for example, use to access or locate geographic location information of the landmark, for example via a lookup table indexed by landmark name. In any event where the control center receives an indication that the vehicle has been activated or tampered with, and the control center does not receive valid operator identification information compliant with predetermined restrictions (e.g., within a predetermined time interval of the activation) then the control center can conclude that use of action upon the vehicle is unauthorized and corrective action should be taken, for example by alerting a user or operator of the control center, alerting law enforcement officials or agencies, and so forth.

In an exemplary embodiment, the monitoring system can be used to identify and track vehicles for sale at a vehicle dealership, vehicles in custody of a vehicle dealership and/or repair station that are awaiting repair or that have been repaired, and so forth. This can be especially useful for tracking a rental and/or for-sale and/or for-sale fleet of vehicles, to provide sales information (for example which cars are being demonstrated and by which salesmen, and which cars appear to be more popular) to identify vehicles requiring preventive maintenance (e.g., cars that have low batteries, to identify precisely where a particular vehicle is located at the dealership or repair station, to demonstrate security products for after market sale to customers, and so forth. In an exemplary embodiment, the control center includes a receiving antenna, a control panel with one or more computer interfaces, and the monitoring system on or in a vehicle includes a transmitter. The monitoring system and the control center can each include one or more computers and/or microprocessors or other computing machines or capacities to support the functions described herein. In the auto dealership example, receiving antennas connecting to the control center can be placed at intervals along a boundary of a geographic zone, for example at intervals of 250 feet along a perimeter of a dealership inventory lot. The antennas can be each provided with an independent power source, can be supplied by a common power source, or can be otherwise arranged or configured. Connections between a receiving antenna and the control center can be formed by wireless radio and/or optic communications, via cable communications (electric or optical), or in any combination thereof including, but not limited to, a computer network such as an internet, a local area network, the internet, the worldwide web, and so forth. The monitoring system onboard or on the vehicle can include different kinds of transmitters, including for example a service hat transmitter, a hard wired transmitter, a transmitter located in a dash or instrument console of the vehicle, and so forth. The transmitters on or in the vehicle can include various human and/or machine interfaces, for example a radio frequency identification reader. The in dash vehicle transmitter or monitoring system can also include a motion detector and can, for example, be simply placed on a dashboard of the vehicle and can include a flashing red light or other signal mechanism to alert people that the car is equipped with various protective or alarm system features. In an exemplary embodiment, the control center can relay or publish an alarm condition to other control centers or agencies or individuals via any appropriate communication pathway or mechanism, for example via telephone, electronic page, facsimile transmission, e-mail, or other communication.

Figure 2:
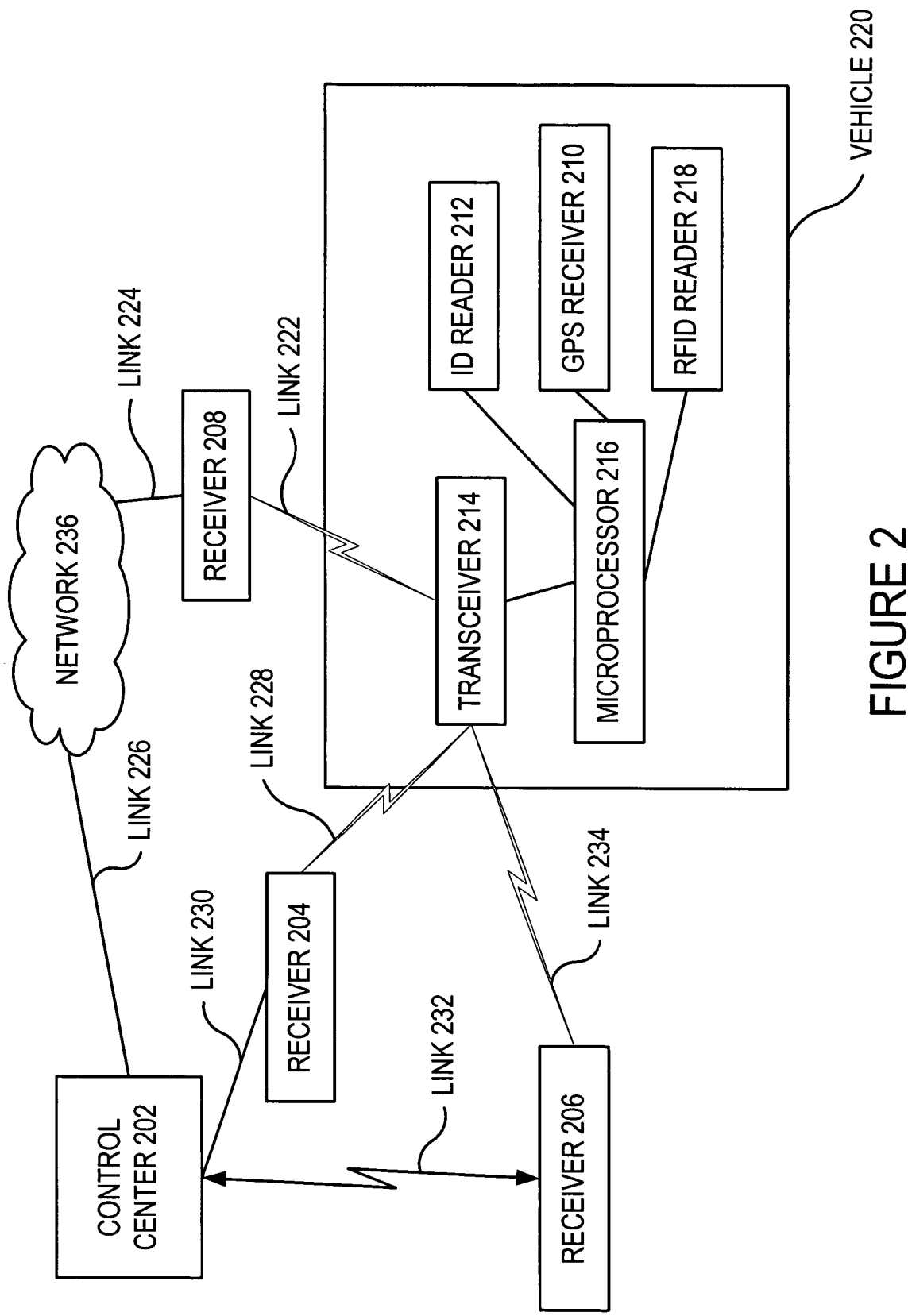
FIG. 2 shows an exemplary system.

FIG. 2 illustrates an exemplary embodiment, wherein a vehicle 220 includes a monitoring system comprising an RFID reader 218, a global positioning system receiver 210, an ID or token reader 212, at a transceiver 214 all connected to a microprocessor 216 that coordinates activities of the monitoring system. As shown in FIG. 2, the transceiver 214 allows the monitoring system to communicate via receivers 204, 206 and 208 with a control center 202. The center 202 can be connected to one or more of the receivers in various ways. For example, FIG. 2 shows a wireless communication link 232 between the control center 202 and the receiver 206, a cable link 230 such as a wire carrying voltage and/or current signals or an optical fiber carrying light signals. The links 226 and 224 can be implemented in the same fashion as the link 230. As shown in FIG. 2, communications from the transceiver 214 to the control center 202 can travel sequentially through different communication media or mechanisms, for example via a wireless link 222, a wired link 224, then through a network 236 such as, for example, the internet, and another wired link 226. Data storage capacity or capability can be provided at the control center 202 and/or in the monitoring system onboard the vehicle 220, for example to provide an archive or a history of data, to collect data between transmissions or communications or for any other purpose. The control center 202, and also the monitoring system onboard the vehicle 220, can each include various user interfaces, such as display screens, keyboards, touch screens, joy sticks, "mice", a camera, a scanner, and so forth.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

What is claimed is:

1. A method for monitoring a vehicle, comprising:
   detecting movement or activation of the vehicle;
   transmitting a signal indicating movement or activation of the vehicle, to a control center;
   transmitting any received operator identification information to the control center;
   determining whether an operator identification was received within a time interval of the detected movement or activation of the vehicle;
   detecting at the vehicle the presence of a landmark; and
   transmitting data identifying the landmark and/or a location of the landmark to the control center.

2. The method of claim 1, comprising:
   determining whether an operator identification was received prior to the detected movement or activation of the vehicle;
   determining whether a received operator identification is valid; and
   setting an alarm condition in a case where a valid operator identification was not received prior to the detected movement or activation of the vehicle.

3. The method of claim 1, comprising:
   setting an alarm condition when the determining indicates that an operator identification was not received within the time interval.

4. The method of claim 3, comprising: transmitting location coordinates of the vehicle provided by a Global Positioning System receiver co-located with the vehicle.

5. The method of claim 3, comprising:
   transmitting a beacon signal from the vehicle;
   receiving the beacon signal at a plurality of different locations; and
   determining a location of the vehicle based on the beacon signal received at the plurality of different locations.

6. The method of claim 5, wherein the control center performs the determining of the location of the vehicle.

7. The method of claim 5, wherein the beacon signal includes one or both of the signal indicating movement or activation of the vehicle and a signal including received operator identification information.

8. The method of claim 3, wherein the steps of transmitting are performed by a radio communications device co-located with the vehicle, and wherein a radio communications service provider that supports operation of the radio communications device indicates a location of the radio communications device to the control center.

9. The method of claim 8, wherein the radio communications device is a cellular phone and the radio communications service provider is a cellular communications service provider.

10. The method of claim 1, wherein the detection is performed by a Radio Frequency IDentification transceiver at the vehicle and a Radio Frequency IDentification tag at the landmark.

11. The method of claim 1, wherein the detection is performed by a Radio Frequency IDentification transceiver at the landmark and a Radio Frequency IDentification tag at the vehicle.

12. The method of claim 1, comprising:
transmitting operational information regarding the vehicle to the control center, wherein the operational information includes one or more of specifications of the vehicle, fluid levels in subsystems of the vehicle, vehicle subsystem fault codes and/or status codes, battery level, speed(s) of the vehicle, and velocities of the vehicle.

13. The method of claim 1, comprising:
receiving operator identification information via a reader at the vehicle, wherein the information is provided to the reader via a token.

14. The method of claim 1, comprising:
receiving operator identification information via a reader at the vehicle, wherein the reader reads biometric information of the operator.

15. A method for monitoring a vehicle, comprising:
detecting movement or activation of the vehicle;
transmitting a signal indicating movement or activation of the vehicle, to a control center;
transmitting any received operator identification information to the control center;
determining whether an operator identification was received within a time interval of the detected movement or activation of the vehicle;
detecting at a landmark the presence of the vehicle; and
transmitting data identifying the vehicle and a location of the landmark to the control center.

16. The method of claim 15, comprising:
determining whether an operator identification was received prior to the detected movement or activation of the vehicle;
determining whether a received operator identification is valid; and
setting an alarm condition in a case where a valid operator identification was not received prior to the detected movement or activation of the vehicle.

17. The method of 15, comprising:
setting an alarm condition when the determining indicates that an operator identification was not received within the time interval.

18. The method of claim 17, comprising: transmitting location coordinates of the vehicle provided by a Global Positioning System receiver co-located with the vehicle.

19. The method of claim 17, comprising:
transmitting a beacon signal from the vehicle;
receiving the beacon signal at a plurality of different locations; and
determining a location of the vehicle based on the beacon signal received at the plurality of different locations.

20. The method of claim 19, wherein the control center performs the determining of the location of the vehicle.

21. The method of claim 19, wherein the beacon signal includes one or both of the signal indicating movement or activation of the vehicle and a signal including received operator identification information.

22. The method of claim 17, wherein the steps of transmitting are performed by a radio communications device co-located with the vehicle, and wherein a radio communications service provider that supports operation of the radio communications device indicates a location of the radio communications device to the control center.

23. The method of claim 22, wherein the radio communications device is a cellular phone and the radio communications service provider is a cellular communications service provider.

24. The method of claim 15, wherein the detection is performed by a Radio Frequency IDentification transceiver at the vehicle and a Radio Frequency IDentification tag at the landmark.

25. The method of claim 15, wherein the detection is performed by a Radio Frequency IDentification transceiver at the landmark and a Radio Frequency IDentification tag at the vehicle.

26. The method of claim 15, comprising:
transmitting operational information regarding the vehicle to the control center, wherein the operational information includes one or more of specifications of the vehicle, fluid levels in subsystems of the vehicle, vehicle subsystem fault codes and/or status codes, battery level, speed(s) of the vehicle, and velocities of the vehicle.

27. The method of claim 15, comprising:
receiving operator identification information via a reader at the vehicle, wherein the information is provided to the reader via a token.

28. The method of claim 15, comprising:
receiving operator identification information via a reader at the vehicle, wherein the reader reads biometric information of the operator.

* * * * *